(12) United States Patent
Khosropour

(10) Patent No.: US 6,821,318 B2
(45) Date of Patent: Nov. 23, 2004

(54) KITCHEN AIR FILTRATION SYSTEM

(75) Inventor: M. Michael Khosropour, Newton, IA (US)

(73) Assignee: Maytag Corporation, Newton, IA (US)

(*) Notice: Subject to any disclaimer, the term of this patent is extended or adjusted under 35 U.S.C. 154(b) by 115 days.

(21) Appl. No.: 10/163,543

(22) Filed: Jun. 6, 2002

(65) Prior Publication Data

US 2003/0226444 A1 Dec. 11, 2003

(51) Int. Cl.[7] .................... B01D 47/02; B01D 53/14
(52) U.S. Cl. ............................. 95/226; 95/227; 95/273; 96/222; 96/247; 96/279; 96/299; 96/329; 96/354
(58) Field of Search .................... 95/149, 185, 204, 95/216, 226, 227, 237, 273; 96/222, 243, 245, 247, 249–251, 279, 299, 329, 331, 333, 343–346, 353, 354, 358, 360

(56) References Cited

U.S. PATENT DOCUMENTS

| | | | |
|---|---|---|---|
| 1,994,766 A | * 3/1935 | Heglar | 96/279 |
| 2,220,414 A | * 11/1940 | Kritzer | 126/6 |
| 2,539,867 A | * 1/1951 | Schnabel | 96/331 |
| 3,381,679 A | 5/1968 | Gonzalez | |
| 3,628,311 A | 12/1971 | Costarella et al. | |
| 3,695,005 A | * 10/1972 | Yuzawa | 96/110 |
| 3,762,394 A | * 10/1973 | Newcomer | 126/300 |
| 3,802,158 A | 4/1974 | Ohle | |
| 3,841,062 A | 10/1974 | Molitor et al. | |
| 4,011,802 A | 3/1977 | Molitor et al. | |
| 4,069,027 A | * 1/1978 | Ward | 95/226 |
| 4,127,106 A | 11/1978 | Jensen | |
| 4,268,285 A | * 5/1981 | Mason | 96/222 |
| 4,323,373 A | 4/1982 | Fritz | |
| 4,351,652 A | 9/1982 | Wisting | |
| 4,361,427 A | * 11/1982 | Barradas | 96/135 |
| 4,407,266 A | 10/1983 | Molitor | |
| 4,484,563 A | 11/1984 | Fritz et al. | |
| 4,822,385 A | 4/1989 | Strege et al. | |
| 5,004,486 A | * 4/1991 | Chen | 96/240 |
| 5,069,197 A | 12/1991 | Wisting | |
| 5,141,538 A | 8/1992 | Derington et al. | |
| 5,192,342 A | * 3/1993 | Baron et al. | 95/90 |
| 5,358,540 A | 10/1994 | Tsan-Yun et al. | |
| 5,359,990 A | 11/1994 | Hsu | |
| 5,472,342 A | 12/1995 | Welsh, II et al. | |
| 5,613,990 A | * 3/1997 | Diachuk | 55/383 |
| 5,622,538 A | * 4/1997 | Diachuk | 55/383 |
| 5,641,338 A | * 6/1997 | Brookman | 95/213 |
| 5,873,930 A | * 2/1999 | Sanchez | 96/278 |
| 6,079,407 A | 6/2000 | Lai | |
| 6,126,729 A | * 10/2000 | Smith | 96/222 |
| 6,238,463 B1 | 5/2001 | Helm | |
| 6,391,093 B1 | * 5/2002 | French et al. | 95/226 |
| 6,393,836 B1 | * 5/2002 | Huang | 60/310 |
| 2003/0177904 A1 | * 9/2003 | Broadbent | 95/154 |

FOREIGN PATENT DOCUMENTS

| | | |
|---|---|---|
| DE | 1156154 | 10/1965 |
| EP | 0 420 373 A3 | 4/1991 |
| GB | 1324304 | 7/1973 |
| GB | 2 116 312 A | 9/1983 |

* cited by examiner

*Primary Examiner*—Robert H. Spitzer
(74) *Attorney, Agent, or Firm*—McKee, Voorhees & Sease, P.L.C.

(57) ABSTRACT

An improved air filtration system is provided for a kitchen island so as to cleanse cooking vapors from the air. The system includes an updraft or downdraft air inlet vent for capturing, either individually or simultaneously, the vapor-containing air generated during the cooking process. The captured air is directed through an exhaust duct to an air filter which removes the cooking vapors from the air. The filtered air is then discharged back into the kitchen. The filtered air may also be dehumidified or heated, and a fragrance may optionally be provided to the filtered air. The air filtration system can also be used simply as air cleaner for the kitchen with the option of adding a fragrance to the air.

29 Claims, 3 Drawing Sheets

KITCHEN AIR FILTRATION SYSTEM

BACKGROUND OF THE INVENTION

Filtration systems, including water-based systems, are known for kitchen ventilation hoods utilized in connection with cooking to remove airborne vapors generated by the cooking process. Typical vent hoods capture the air, which is discharged through an exhaust duct to the atmosphere outside the house. A filter may be provided to filter the air before discharge. Kitchen islands, wherein the stove is located apart from any kitchen walls, present more complex exhaust problems, in that an exhaust duct must extend upwardly to the ceiling or downwardly through the floor before being directed to an outside wall for discharge of the collected air. As the distance from the stove to the outside wall increases, larger blowers are required to force the air through the exhaust duct for outside discharge.

Therefore, a primary objective of the present invention is the provision of an improved air filtration system for a kitchen which cleans and recycles the air back into the kitchen.

Another objective of the present invention is the provision of an improved air filtration system for use with a kitchen vent hood or down draft exhaust system either individually or simultaneously.

A further objective of the present invention is the provision of an improved air filtration system for cleaning kitchen air containing cooking vapors.

Another objective of the present invention is the provision of a kitchen stove exhaust system including an air filter for cleansing air collected by an updraft or downdraft vent and returning the cleansed air back to the kitchen.

Still another objective of the present invention is the provision of an air filtration system for kitchen stoves which dehumidifies the filtered air.

Still another objective of the present invention is the provision of an air filtration system for kitchen stoves which heats the filtered air.

Still another objective of the present invention is the provision of an air filtration system for kitchen stoves which adds a fragrance to the air.

Another objective of the present invention is the provision of a water-based air filtration system for a kitchen stove.

A further objective of the present invention is the provision of an improved method for filtering cooking vapors from air generated during a cooking process on a stove.

Yet another objective of the present invention is the provision of an air filtration method for cleaning vapors from kitchen air and recycling the filtered air to the kitchen.

These and other objectives will become apparent from the following description of the invention.

SUMMARY OF THE INVENTION

The present invention is directed towards an improved air filtration system and method for use with a kitchen stove to cleanse cooking vapors generated during the cooking process from the air. The filtration system includes an updraft or downdraft vent or both for capturing the airborne cooking vapors, and an exhaust duct which directs the captured air to an air filter which cleans substantially all the cooking vapors from the air. Preferably, the air filter is a water-based system wherein the air is bubbled through water to remove vapors therefrom. The filtered air is then recycled or discharged back into the kitchen. A dehumidifier may be provided in the system to reduce the humidity of the filtered air. A heater may also be provided downstream from the filter to heat the cleaned air before discharge into the kitchen. A fragrance may also be added to the air before the air is returned to the kitchen.

The method according to the present invention for filtering cooking vapors from air generated during a cooking process on a stove includes the steps of venting the air and cooking vapors through an exhaust duct, filtering the air and cooking vapors through a filter to remove the cooking vapors from the air, and discharging the filtered air into the kitchen. The method may also include dehumidifying, heating, and adding fragrance to the air before discharging the cleansed air into the kitchen.

DETAILED DESCRIPTION OF THE DRAWINGS

Figure 1:
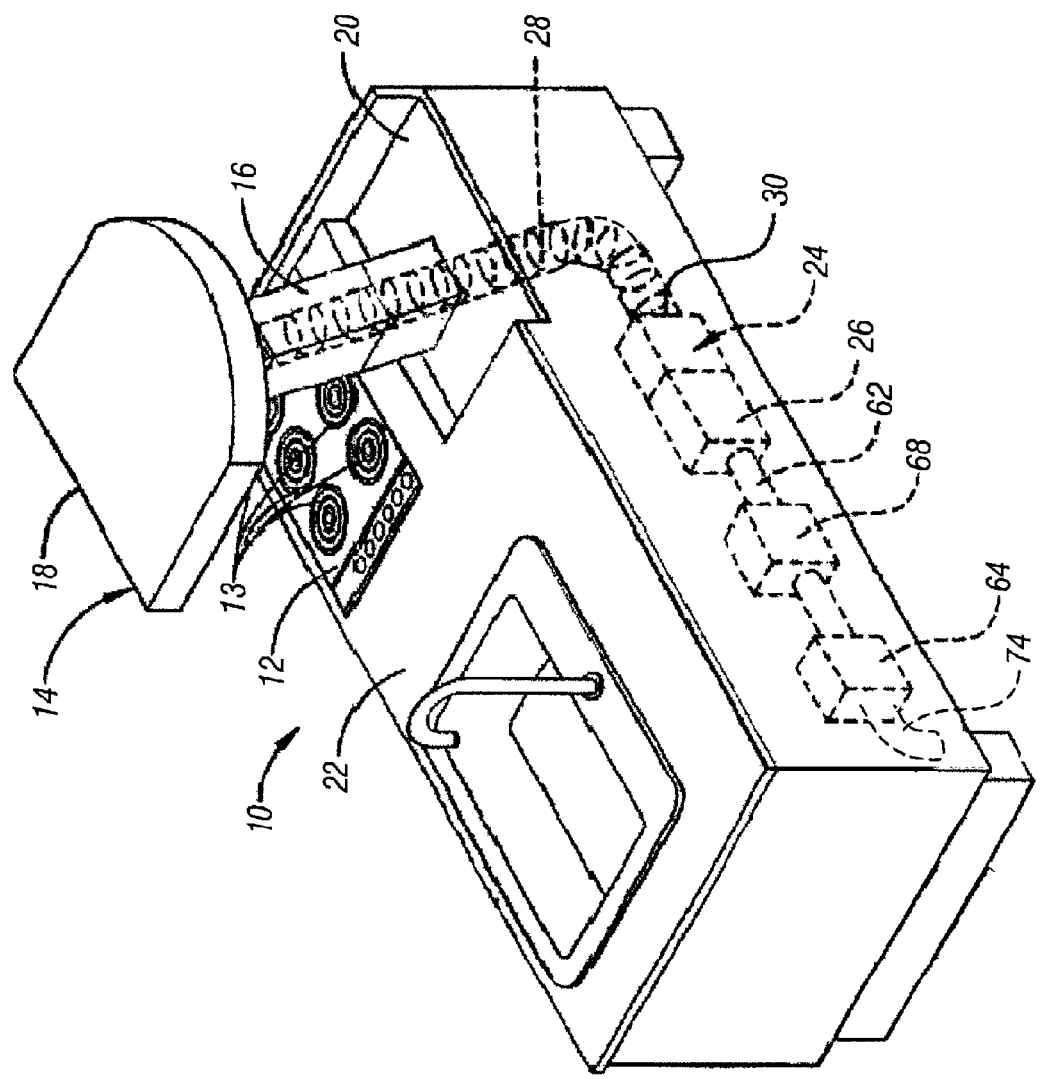
FIG. 1 is a perspective view of a kitchen island having the filtration system of the present invention.

A kitchen island is generally designated by the reference numeral 10 in the drawings. The island 10 includes a stove top or cooking surface 12 with a plurality of burners 13 and a vent hood assembly 14. The vent hood assembly 14 includes a telescoping lift column 16 with a retractable and extendable vent hood 18 of the present invention. The vent hood assembly 14 extends upwardly in the operative or use position from a recessed area 20 in the rear portion of the island 10. In the non-use or storage position, the vent hood assembly 14 resides within the recess 20. Preferably, when the vent hood assembly 14 is lowered and retracted into the recess 20, the top of the vent hood 18 is slightly above the countertop 22 of the island 10 so as to discourage the setting of an object on the edge of the vent hood 18 where the object could fall off or spill when the vent hood assembly 14 is raised. Alternatively, the top of the vent hood 18 can be flush with the countertop 22 when the vent hood assembly 14 is in the storage position. The lift column 16 preferably extends at a non-perpendicular angle relative to the cooking surface 12. The angle is in the range of 10°–20° from vertical, with the preferred angle of 15°.

The vent hood 18 is mounted on the lift column 16 so as to be horizontally moveable between a retracted position for receipt in the recess 20, and an extended position covering the burners 13. The angular orientation of the lift column 16 allows the vent hood 18 to be positioned fully over the cooking surface 12 with less forward movement, as compared to a vertical column. While it is understood that the lift column 16 may be oriented vertically, such a vertical orientation would require a greater extension of the vent hood 18 for positioning over the cooking surface 12.

This movement structure is described in applicant's co-pending application Ser. No. 10/163,558, entitled IMPROVED KITCHEN VENT HOOD, filed Jun. 6, 2002, and is incorporated herein by reference.

The filtration system of the present invention is housed within the island 10 beneath the countertop 22. More particularly, an air filter 24 is operatively connected to a blower 26 so as to draw air into the vent hood 18 and through a flexible duct 28 extending between the vent hood 18 and the air filter 24. Preferably, the air filter 24 is a water-based filter system. The air filter 24 includes a tank 30 which is partially filled with water. The tank 30 includes three air inlet tubes 32, 34, 36. The duct 28 may be split into three lines mating with the inlet tubes 32, 34, 36. Alternatively, if the cooking surface 12 is provided with a downdraft vent system, in addition to the updraft vent hood 18, one of the ducts 32, 34, 36 can be coupled to the downdraft exhaust duct (not shown). As another alternative, one of the inlet tubes 32, 34, 36 can be open to receive ambient air from the kitchen drawn into the island to pass through the air filter 24.

Figure 2:
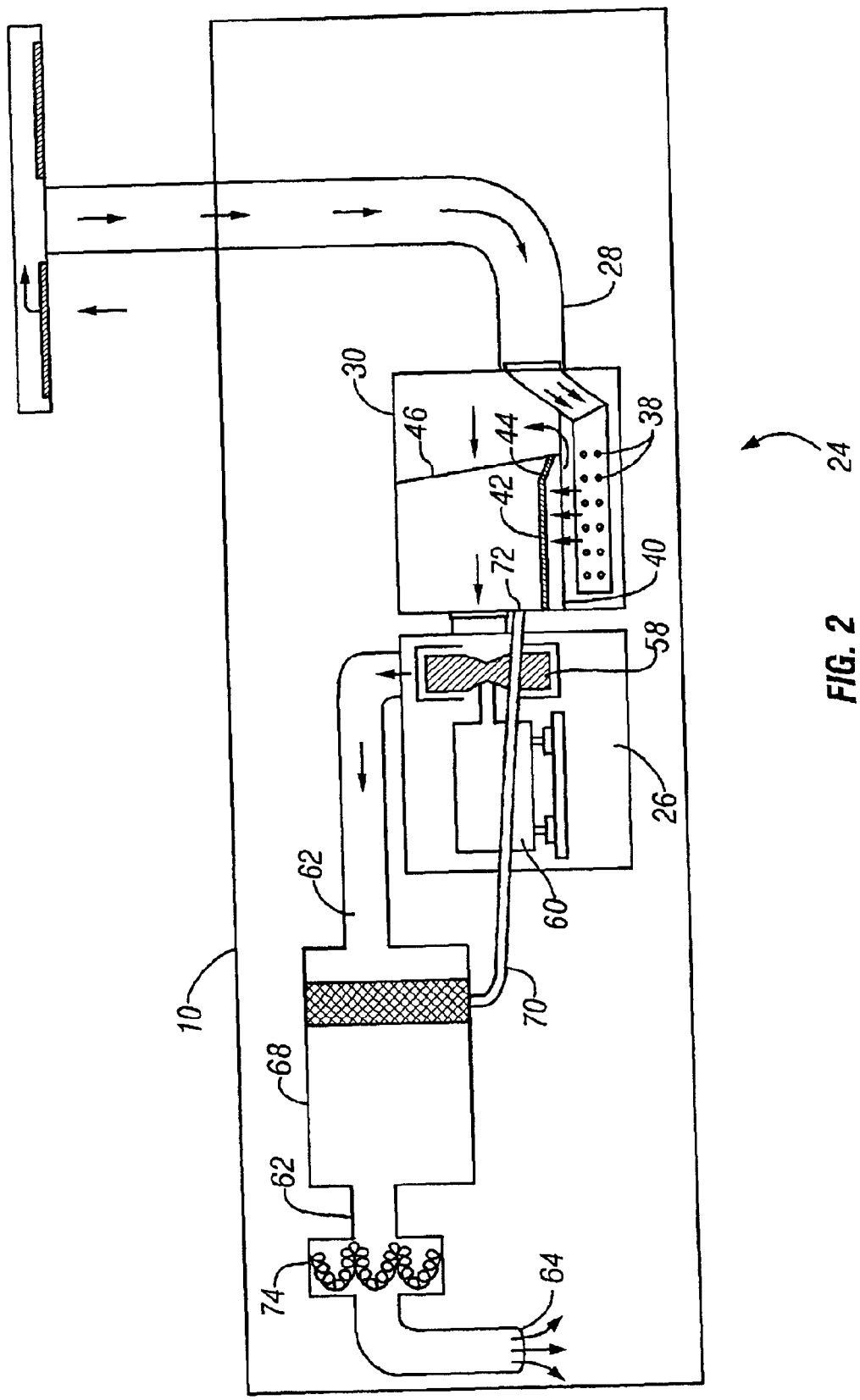
FIG. 2 is a schematic view showing the filtration system of the present invention.

Each of the air inlet tubes 32, 34, 36 includes a plurality of perforations 38 which reside beneath the water level 40. Tank 30 also includes a shelf 42 having a downwardly sloping forward end 44. A perforated plate 46 extends upwardly from the sloped edge 44 of the shelf 42, and preferably is angled slightly rearwardly, as best seen in FIG. 2.

Figure 3:
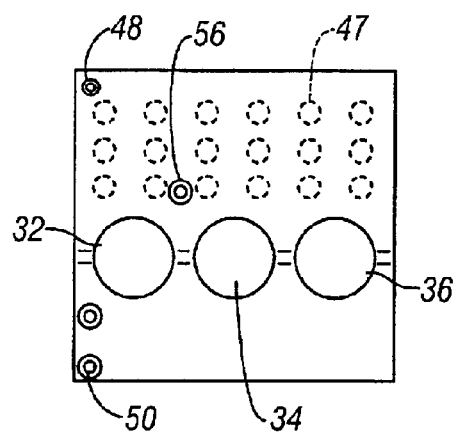
FIG. 3 is a front elevation view of a water-based filtration tank used in the present invention.
Figure 4:
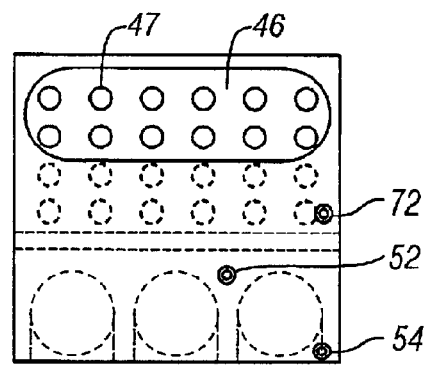
FIG. 4 is a rear elevation view of the water tank filter.
Figure 5:
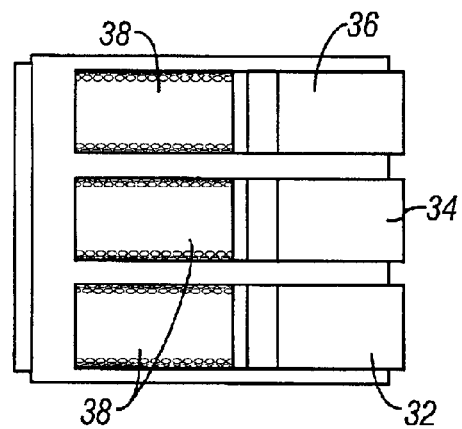
FIG. 5 is a top plan view of the water tank filter with the top wall removed for clarity.

As best shown in FIGS. 3 and 4, the tank 30 also includes a plurality of couplings. More particularly, the couplings include a water inlet coupling 48 for adding water to the tank 30, and a drain coupling 50 for draining water from the tank 30. A float coupling 52 is also preferably provided for operative connection to a float for monitoring the water level 40 in the tank 30. A temperature probe coupling 54 may also be provided for operative connection to a temperature probe to monitor the temperature of the water in the tank 30. A fragrance coupling 56 may also be optionally provided so that a selected fragrance can be added to the air in the filtration system.

The blower 26 includes an impeller 58 driven by an electric motor 60. The impeller 58 draws air into the vent hood 18, through the exhaust duct 28, and into the filter tank 30. The blower has an outlet duct 62 which extends to an opening 64 within the island 10 such that the filtered air is discharged within the island 10 and then randomly dispersed into the kitchen.

The filter system of the present invention may alternatively include a dehumidifier 68 operatively mounted in the outlet duct 62 so as to remove moisture from the filtered air before discharge into the kitchen. Such dehumidification is desirable in hot humid atmospheres. The dehumidifier includes a drain hose 70 which is coupled to the water tank 30 via a coupling 72.

As a further alternative, the filter system of the present invention may also include a heater 74 operatively mounted in the outlet duct 62. The heater 74 can be selectively actuated to heat the filtered air before discharge within the island 10 and into the kitchen, which may be desirable to bring the filtered air to room temperature.

The method of filtering cooking vapors from air generated during a cooking process on a cooking stove includes the initial step of venting the air and vapors through an exhaust duct, either by updraft or downdraft action and operated individually or simultaneously. The air and cooking vapors are then passed through a filter, such as the water-based filter 24, to remove the cooking vapors from the air. The water absorbs the vapors from the air as the air passes through the water. Such cleansing of the air occurs by bubbling the vapor-containing air through the water via the perforations 38 in the air inlet tubes 32, 34, 36. The bubbled air carries water upwardly to the bottom of the shelf 42 and passes downwardly over the sloping edge portion 44 wherein most of the water drops out of the air. The air continues to rise and pass through the perforations 47 of the perforated plate 46, which causes additional water to be shed from the air.

The filtered air is then forced through the outlet duct 62 by the blower 28. If the dehumidifier 68 is provided and actuated, moisture in the clean air will be removed. If the heater 74 is provided and actuated, the clean air will be heated before discharge through the island opening 64 back into the kitchen.

Also, as another alternative, if a fragrance source is connected to the fragrance coupling 56 on the tank 30, a selected fragrance may be added to the filtered air to provide a desired aroma in the kitchen.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of filtering cooking vapors from air generated during a cooking process on a kitchen island, comprising:
    drawing air and cooking vapors into a hood above the island;
    directing the air and cooking vapors through an exhaust duct to a filtration system;
    filtering the air and cooking vapors to remove the cooking vapors from the air;
    passing the filtered air through a duct in the island; and
    discharging filtered air into the kitchen from the duct in the island.

2. The method of claim 1 further comprising dehumidifying the filtered air in the island before discharge into the kitchen.

3. The method of claim 1 further comprising heating the filtered air in the island before discharge into the kitchen.

4. The method of claim 1 further comprising adding fragrance to the air in the island before discharge into the kitchen.

5. The method of claim 1 wherein the filtering is accomplished by bubbling the air and cooking vapor through water in a tank in the island.

6. A kitchen island air filtration system, comprising:
    an air inlet vent positioned above the island for capturing air containing cooking vapors from a cooking process;
    an air duct operatively connected to the vent and extending downwardly into th island for carrying the air and cooking vapors;
    an air filter for receiving air and cooking vapors from the duct and for cleaning substantially all cooking vapors from the air;
    an air outlet in the island operatively connected to the filter for discharging the leaned air back into the kitchen.

7. The air filtration system of claim 6 further comprising a blower in the island for drawing air and cooking vapors through the duct and into the filter.

8. The air filtration system of claim 6 further comprising a dehumidifier in the island downstream from the filter to dehumidify the cleaned air before discharge into the kitchen.

9. The air filtration system of claim 6 further comprising a heater in the island downstream from the filter to heat the cleaned air before discharge into the kitchen.

10. The air filtration system of claim 6 further comprising a fragrance supply in the island for adding fragrance to the air before discharge to the kitchen.

11. The air filtration system of claim 6 wherein the filter includes a tank in the island partially filled with water through which the air is bubbled to remove cooking vapors.

12. The air filtration system of claim 11 wherein the tank includes a shelf for collecting air and water vapor.

13. The air filtration system of claim 12 wherein the shelf includes a downwardly extending forward edge to facilitate separation of water vapor from the air.

14. The air filtration system of claim 11 further comprising upright perforated wall through which the air passes to separate water vapor from the air.

15. The air filtration system of claim 14 wherein the perforated wall is rearwardly inclined.

16. The air filtration system of claim 11 wherein the tank includes a drain line for discharging water.

17. The air filtration system of claim 11 wherein the tank includes a water inlet line.

18. The air filtration system of claim 11 wherein the tank includes a float to monitor water level.

19. The air filtration system of claim 11 wherein the tank includes a fragrance inlet line.

20. The air filtration system of claim 11 wherein the tank includes a water overflow line.

21. The air filtration system of claim 6 wherein the exhaust duct is split into multiple lines before entering the filter.

22. The air filtration system of claim 6 wherein the filter is in the island.

23. In combination, a kitchen cooking island and an air handling system for recycling air from a cooking process back into the kitchen, the combination comprising:

an island in the kitchen and having a cooking surface;

a hood extending upwardly from the island and positioned over the cooking s ace to capture air containing cooking vapors;

a duct extending from the hood and downwardly into the island;

an air filter to receive and clean the air captured by the hood; and an air outlet in the island to discharge cleaned air back into the kitchen.

24. The combination of claim of 23 further comprising a blower in the island for drawing air and cooking vapors through the duct and to the filter.

25. The combination of claim 23 further comprising a dehumidifier in the island downstream from the filter to dehumidify the cleaned air before discharge into the kitchen.

26. The combination of claim 23 further comprising a heater in the island downstream from the filter to heat the cleaned air before discharge into the kitchen.

27. The combination of claim 23 further comprising a fragrance supply in the island for adding fragrance to the air before discharge into the kitchen.

28. The combination of claim 23 wherein th filter includes a tank in the island partially filled with water through which the air is bubbled to remove cooking vapors.

29. The combination of claim 23 being free of any air duct extending out of the kitchen.

\* \* \* \* \*